Figures 1, 2:
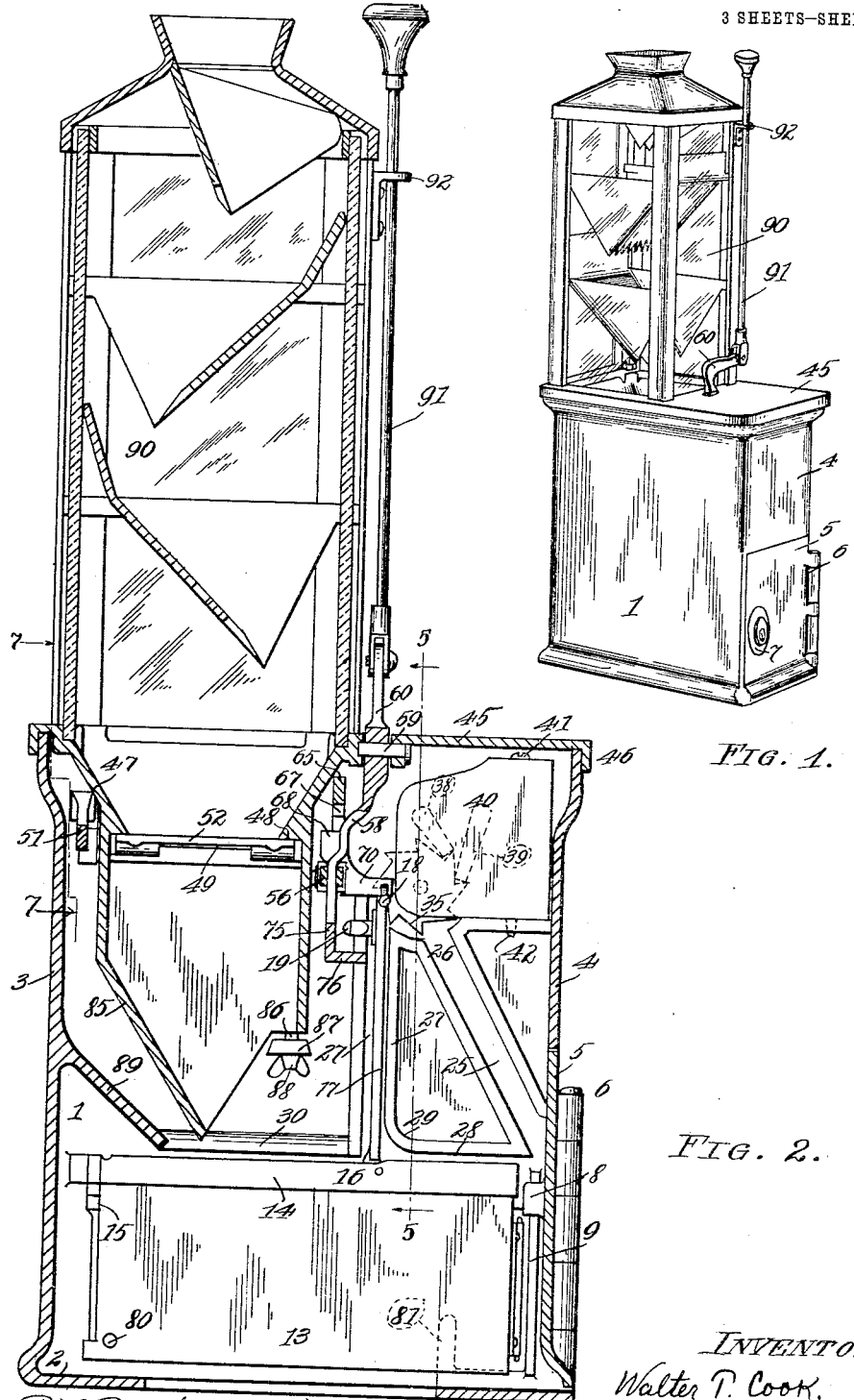

W. T. COOK.
FARE BOX.
APPLICATION FILED MAY 3, 1913.

1,105,621.

Patented Aug. 4, 1914.

3 SHEETS—SHEET 1.

WITNESSES
P. L. Bruck
Brennan B. West

INVENTOR.
Walter T. Cook,
BY Hull & Smith
ATTYS.

W. T. COOK.
FARE BOX.
APPLICATION FILED MAY 3, 1913.

1,105,621.

Patented Aug. 4, 1914.
3 SHEETS—SHEET 2.

WITNESSES:
P. L. Bruck
Brennan B. West

INVENTOR.
Walter T. Cook
BY Hull & Smith
ATTY'S.

W. T. COOK.
FARE BOX.
APPLICATION FILED MAY 3, 1913.

1,105,621.

Patented Aug. 4, 1914.

3 SHEETS—SHEET 3.

WITNESSES:
P. L. Bruck
Brennan B. West

INVENTOR.
Walter T. Cook
By Hull & Smith
ATTY'S.

THE NORRIS PETERS CO., PHOTO-LITHO., WASHINGTON, D. C.

UNITED STATES PATENT OFFICE.

WALTER T. COOK, OF CLEVELAND, OHIO.

FARE-BOX.

1,105,621.  Specification of Letters Patent.  Patented Aug. 4, 1914.

Application filed May 3, 1913. Serial No. 765,250.

*To all whom it may concern:*

Be it known that I, WALTER T. COOK, a citizen of the United States, residing at Cleveland, in the county of Cuyahoga and State of Ohio, have invented a certain new and useful Improvement in Fare-Boxes, of which the following is a full, clear, and exact description, reference being had to the accompanying drawings.

This invention relates to fare boxes or money collection receptacles, such as are at present used largely upon street cars and the like and also to some extent in collecting admission fees to fairs, recreation parks, ferries, dance halls and in other places where a definite fare or admission fee is charged. Inasmuch, however, as the present use for devices of this character is most largely in connection with street railways, the following description will bear particular reference to this use, but without any intention to limit the applicability of the invention.

In my copending application, filed April 22, 1913, Serial No. 762,816, I have disclosed and claimed a highly convenient and efficient fare box of the same type as that to which this invention relates.

The main objects of each of the inventions are the same, namely; the improvement of devices of this type in point of simplicity, reliability, cheapness and security; the provision of a fare box having a removable receptacle for the reception of the fares, said box being arranged to be tightly closed and locked upon the withdrawal of the same; the provision of novel and simplified means for preventing the escape or discharge of coins, tokens, or tickets from the inspection box unless the collection receptacle be in place ready to receive the same; the provision of means for preventing the removal of the collection receptacle except while the passageway between the inspection box and receptacle is open, so that no coins, tokens, or tickets can be left within the inspection box; the provision of means absolutely preventing the removal of the collection receptacle without actual locking of the cover thereof; the provision of means for preventing the insertion of the collection receptacle into the casing except with the cover open so that fares can be transferred from the inspection box into the same; the provision of a new and improved construction and arrangement of parts so as entirely to prevent access to the securing devices whereby the parts are fastened together excepting after the removal of said collection receptacle; and the provision of a construction preventing the lodgment or stoppage of the coins, tickets, or tokens at any point between the inspection box and the collection receptacle.

In addition to these, the particular object of the present invention is the provision of an operating means entirely different from that shown in the first mechanism whereby all of the same operations may be effected; the provision of operating means having a minimum of opportunity for wear; and the provision of an arrangement of operating mechanism which will permit the conductor or other attendant to operate the box from a higher level than in the case of the former device; while further objects and advantages will become apparent as the description proceeds.

Figure 3:
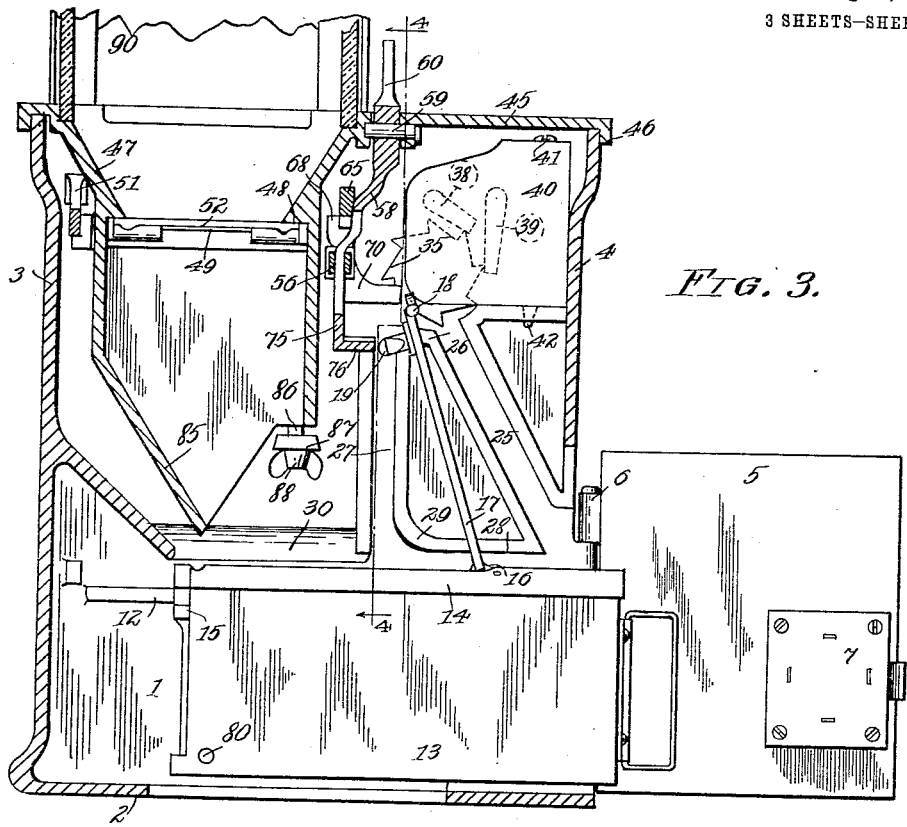
Figure 4:
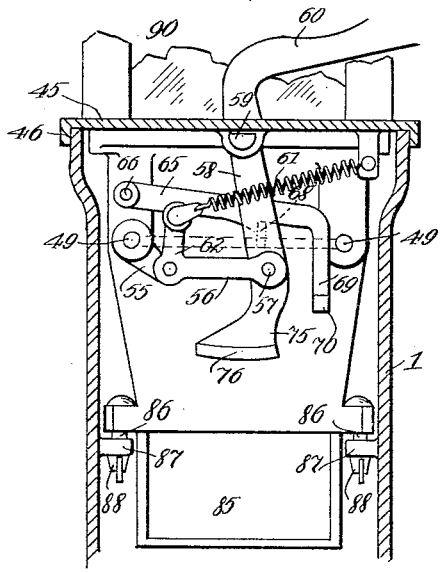
Figure 5:
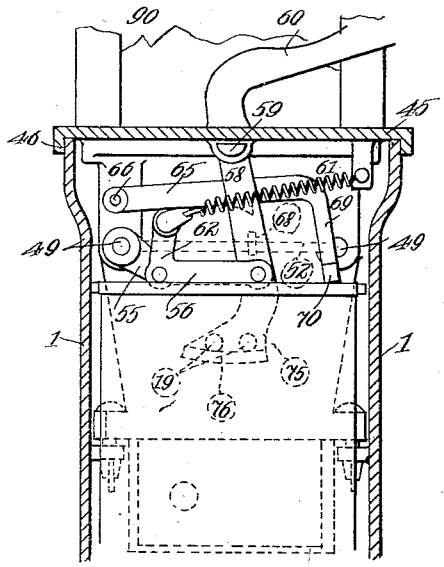
Figure 6:
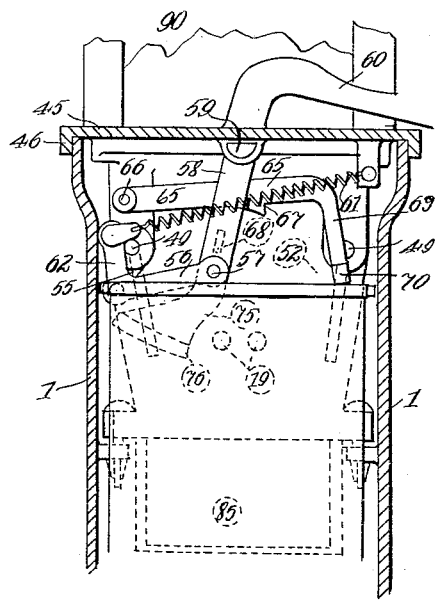
Figure 7:
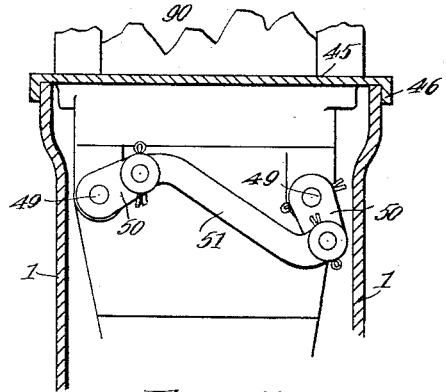

Generally speaking, the present invention may be defined as consisting of the combinations and constructions recited in the claims hereto annexed and illustrated, in one embodiment, in the drawings accompanying and forming a part of this application, wherein:

Figure 1 is a perspective view of the complete fare box; Fig. 2 is a vertical, longitudinal, cross-sectional view through the same, the collection receptacle being shown in receiving position; Fig. 3 is a vertical, longitudinal, cross-sectional view through the box, the collection receptacle being illustrated in a partly inserted position; Fig. 4 is a vertical, transverse, cross-sectional view taken upon the broken line 4—4 and looking in the direction of the arrows, showing the arrangement of the parts when the collection receptacle is absent; Figs. 5 and 6 are vertical, transverse, cross-sectional views taken upon the line 5—5 of Fig. 1 and looking in the direction of the arrows, the operating parts being shown in different positions in the two views; Fig. 7 is a detail view taken upon the broken line 7—7 of Fig. 2 and looking in the direction of the arrows; and Fig. 8 is a perspective view of a collection receptacle prior to its insertion into the casing and showing the cover in partially open position.

Describing the parts by reference characters, the casing of my improved fare box preferably consists of a rectangular hollow metal casting having walls 1—1, bottom 2, back 3, and front 4, cast in a single piece but having an open top. The front 4 is formed adjacent to its lower portion with a rectangular aperture adapted for the reception of a swinging door 5, which is pivoted to the casing by means of a suitable hinge 6, and may be secured in closed position by means of a suitable lock, as shown at 7. The rearward edge of the door is formed with an integral hook 8 adapted to engage a suitable rim 9 carried by the casing so as to prevent the removal of the door even if the hinge should be tampered with or destroyed.

Figure 8:
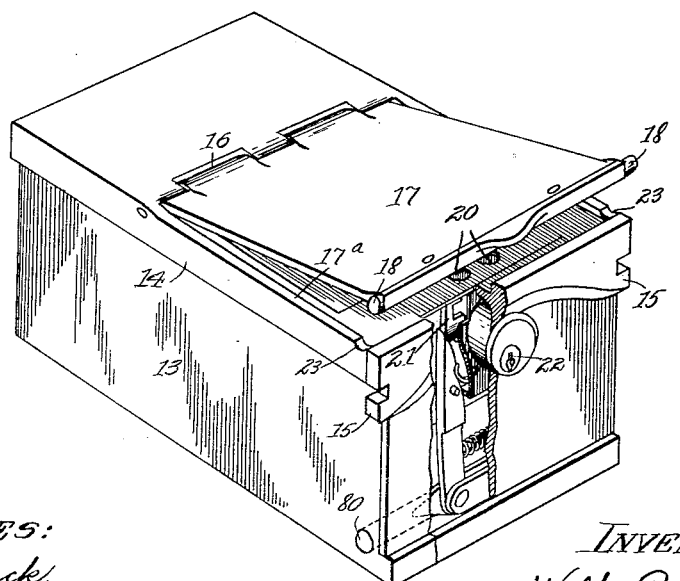

Projecting inwardly from each of the walls 1—1 is an integral, horizontal, rib 12 forming a guide and to these guides is slidably fitted a cash box or collection receptacle 13, illustrated generally in Fig. 8. This receptacle is preferably generally rectangular in shape and has at the upper margin of each of its sides a laterally projecting portion 14, here formed as a part of the top of the receptacle, having a smooth lower edge adapted to rest upon the ribs 12—12 and support the receptacle in its place. The inner end of the receptacle is formed at each side with a laterally projecting ear 15 adapted to fit beneath the corresponding rib 12 and so fix definitely the vertical position of the receptacle.

Pivoted to the top of the receptacle upon a transverse axis 16 intermediate the ends thereof is a cover 17. The width of this cover is preferably the same as that of the body of the receptacle and the projection 14 is preferably carried upwardly around the sides as at 17ª, forming a recess adapted to contain the cover when the same is closed so as to prevent the insertion of a prying tool therebeneath. The free end of the cover is provided at each side with a laterally projecting ear 18 extending therefrom to substantially the same distance as the projection 14. Also at its free end the cover 17 is provided with a pair of parallel notched posts 19—19 adapted to project into the apertures 20—20 of a suitable lock carried by the end of the receptacle 13 and there be engaged by suitable spring-pressed locking members 21 whereby the cover will be held closed until those members are released by the rotation of the barrel 22 of that lock. The upper edge of each of the projections 14 is preferably notched as shown at 23 for the reception of the ears 18 when the cover is locked.

Formed in the interior of each of the walls 1 above the rib 12 is a guideway for the reception of the ears 18 and the consequent operation of the cover 17. This guideway has an inclined portion 25 leading upwardly and rearwardly from a point just within the door 5; a curved portion above and merging with said inclined portion, said curved portion being defined by the arcuate wall 26; a vertical portion 27 at the rear of said inclined portion and also merging with said curved portion; and a horizontal portion 28 connecting the lower end of the vertical portion with the beginning of the inclined portion. This guideway is defined in the present embodiment between ribs cast integral with the casing walls, although it is obvious that the walls of these guideways need neither be narrow nor integral to effect the result in view. At the junction of the vertical portion 27 and horizontal portion 28 of this guideway the upper wall thereof is formed of a curved or wedging shape as illustrated at 29 so that the ears 18—18 will be pressed downwardly as the receptacle is withdrawn. The portion 28 is defined at its lower side by the rib 12, the total width of this portion of the guideway being not materially greater than the combined thickness of the projection 14 and ear 18 so as to effect the secure locking of the cover as the receptacle is withdrawn. At the rear of the vertical portion 27 of this guideway the walls of the casing are formed with inwardly projecting shelves 30, the lower edges whereof are spaced from the ribs 12 a sufficient distance to permit the insertion therebetween of the projection 14 with the cover elevated, but to prevent the introduction of both the cover and projection. This prevents the insertion of the receptacle except in the prescribed manner.

Pivoted to the inside of each of the casing walls above and concentric with the arcuate rib portion is a ratchet wheel 35 having slanting teeth, these teeth being so disposed that the abrupt portions thereof are presented toward the inclined portion 25 of the passageway. Also pivoted to the interior of this casing wall are suitable pawls 38 and 39 adapted to engage the teeth of the ratchet to prevent retrograde movement thereof, these pawls being held in engagement with the teeth either by springs or by gravity, as may be desired. The length of the pawls and their position is arranged so as to stop the ratchet wheel with the inclined portions of the various teeth in substantial alinement with the vertical portion 27 of the guideway. All of the ratchet wheel excepting a portion adjacent to the rib 26 is covered and inclosed by a suitable plate 40, which is preferably secured in place by suitable screws 41 threaded into an upwardly facing shoulder adjacent to the top of the casing. The other portions of the plate may be steadied by having suitable projections 42 adapted to seat in suitable apertures formed in protuberances carried by the casing wall.

The open upper end of the casing is closed by means of a cover 45 which carries the inspection box, coin chute and operating parts, and prevents access to the remainder of the mechanism. Said cover preferably consists of a flat metal plate having a depending marginal lip or flange 46 adapted to overlap the upper end of the casing wall. Formed in this cover at the portion above the inner end of the receptacle is an integral hopper 47 terminating in a horizontal, flat, downwardly-facing ledge 48. Journaled at each side of said hopper in suitable brackets is a rock shaft 49, each of which is preferably parallel to the walls 1—1 of the casing, and carries at its rear end a radial arm 50, the ends of these arms being articulated to the ends of a link 51 whereby the shafts are caused to rock in unison. Secured to each of the shafts 49 inside of the hopper 47 is a leaf 52 which coöperates with the leaf of the opposite shaft in forming a pair of folding doors whereby the passage through the hopper is closed. These leaves lie in the same planes as their shafts so as to fit tightly together when closed and when opened act as deflectors to drop the fares in the center of the receptacle.

Secured to the forward end of one of the shafts 49 is an arm 55, and pivoted to the end of this arm is a link 56. The opposite end of this link is pivoted at 57 to the depending arm 58 of an operating lever, itself pivoted to the cover at 59 and here shown as having a horizontal arm 60 above and outside the cover and substantially parallel thereto, although any formation of lever can be used. It will be obvious that upon the swinging of this lever the shafts 49—49 will be rocked. A spring 61 connected to a suitable part of the cover and to a branch 62 of the link 56 normally maintains the leaves 52 in closed position. In order to prevent the opening of these leaves so as to discharge any coins, tickets, or tokens contained in the hopper 47 except that a collection receptacle be present to receive the same, a hook member 65 is pivoted to the hopper as at 66 and is formed on its lower face with an abrupt shoulder 67 adapted to engage a stop or abutment 68 carried by the arm 58 and prevent the swinging thereof. This hook member is also formed with a depending leg 69 ending in a forwardly projecting portion 70 which extends into the path of the cover 17 as illustrated in Figs. 2, 5, and 6 so as to be displaced thereby sufficiently to free the shoulder 67 from the abutment 68.

In order to make sure that all fares in the hopper 47 have been transferred to the receptacle before the withdrawal of the same, it is desirable to arrange the mechanism so as to prevent the removal of the receptacle except when the leaves 52 are open. For this purpose I prolong the arm 58 below the pivot 57 to form an extension 75, and at the lower end of this extension I form a forwardly projecting arcuate flange 76. This flange normally projects sufficiently near to the vertical portion 27 of the guideways to prevent the passage of the posts 19 as shown in Figs. 2 and 5 unless the arm be swung laterally as illustrated in Fig. 6 so as to open the leaves 52 whereupon the receptacle can be removed without obstruction.

The receptacle 13 is introduced into the casing with its cover partially open, whereupon the ears 18—18 ride upwardly along the inclined passageways 25 and come into contact with the ratchet wheels 35 which they advance sufficiently to permit them to pass into the vertical passageways 27. The arcuate flange 76 is so disposed with reference to this ratchet wheel that the posts 19—19 just clear the edge of the same during the insertion of the receptacle as illustrated in Fig. 3, so that no manipulation of any kind is necessary for the insertion of the receptacle excepting to slide the same longitudinally along its guides 12—12. During the insertion of this receptacle the edge of the cover 17 engages the portion 70 of the hook 65 thereby lifting the same out of contact with the abutment 68 and permitting the swinging of the lever 58. The removal of the receptacle is impossible until the arm 58 has been swung laterally, whereupon a mere pull upon the handle thereof withdraws it, the guideway 27 meanwhile returning the cover 17 to closed position. I preferably employ in connection with the lock a pair of protrudable bolts located in suitable apertures 80 formed in the wall of the receptacle and adapted to be retracted only while the securing members of the lock are in engaging position, as disclosed and claimed in my co-pending application hereinbefore mentioned. This construction prevents any dishonest employee from gaining access to the receptacle by the expedient of wedging the lock, since this wedging would cause the protrusion of these members so as to engage suitable ribs or stops 81 carried by the casing and prevent the withdrawal of the receptacle.

Below the leaves 52—52 the hopper is extended to form a chute 85 whereby the coins, tokens, or tickets are conveyed directly to the receptacle. This chute being integral with the hopper and with the cover 45 also preferably forms a means for securing the cover in place, such securing being effected by means of bolts 86 secured to the chute and passing through an apertured lug 87 carried by the wall of the casing and secured in place by thumb nuts 88, the whole being so located behind the cover 17 as to be inaccessible so long as the receptacle is in place. Suitable shelves or baffle plates 89 may also be formed within the casing so as to prevent coins or tokens from rebounding out of the receptacle and so as to minimize the danger of the overflowing of the receptacle merely through overfilling.

Carried by the cover 45 above the hopper 47 is the inspection box indicated generally by the reference character 90. While I prefer, for practical reasons, to employ the construction of inspection box disclosed and claimed in my copending application hereinbefore referred to, it will be obvious that any desirable or suitable type may be used within the scope of my invention, since its purpose is merely to permit the conductor or other attendant to observe the kind, quantity and genuineness of the coins or other fares deposited therein, and at the same time to prevent that conductor, attendant, or any other person from abstracting such coins or tokens therefrom. Accordingly, for the purposes of the present invention, any device of this general nature may be esteemed the equivalent of the device herein shown so far as concerns the combination with and operation of the fare box mechanism herein particularly set forth. Also while it is obvious that any suitable mechanism may be employed for moving the lever arm 60 for the actuation of this mechanism, the device which I have disclosed consists of a reciprocable rod 91 pivoted to said lever at its lower end and slidably guided in a bracket 92 carried by the inspection box, the upper end of this rod being thereby held at a sufficient elevation so as to be easily accessible in case the conductor or other attendant stands upon a platform at the side of the fare box as is sometimes the case at present when the fare box stands upon the car platform, and the conductor upon the floor of the car itself.

While I have described my invention in detail and pointed out at considerable length the reasons for and advantages of these details, it will be obvious that many changes in arrangement, construction, and operation of parts may be adopted without affecting materially the operation of the device or detracting seriously from the advantages thereof. All such modifications, changes and rearrangements I therefore esteem within the purview of my invention, except as the same are specifically excluded by the terms of the claims hereto annexed or rendered unpatentable by the state of the prior art.

Having thus described my invention, what I claim is:—

1. In a fare box, the combination, with a casing and a receptacle insertible therein, said receptacle having a movable cover and a spring lock adapted to prevent the opening of said cover once the same has been closed, of an inspection box carried by said casing and having a discharge opening beneath which said receptacle is inserted, displaceable means normally closing said opening, mechanism for operating said displaceable means, and means for closing said cover upon the removal of said receptacle from said casing, said mechanism being formed for interengagement with a part of said cover whereby the closing of said cover will be prevented until said mechanism has been actuated to remove said displaceable means from obstructing position.

2. In a fare box, the combination, with a casing and a receptacle insertible therein, said receptacle having a movable cover and a spring lock adapted to prevent the opening of said cover once the same has been closed, of an inspection box carried by said casing and having a discharge opening beneath which the receptacle is inserted, displaceable means normally closing said opening, a pivoted member operatively connected to said displaceable means and adapted to be swung laterally upon displacement of said means, an engaging member carried by said casing and adapted to coöperate with said pivoted member in a manner to prevent the movement thereof, one of said members being arranged to be engaged by a part of said cover when the same is fully inserted beneath said discharge opening so as to permit the swinging of said first member, and means for closing said cover upon the removal of said receptacle from said casing.

3. In a fare box, the combination, with a casing and a receptacle insertible therein, said receptacle having a movable cover and a spring lock adapted to prevent the opening of said cover once the same has been closed, of an inspection box carried by said casing and having a discharge opening beneath which said receptacle is inserted, displaceable means normally closing said opening, a pivoted member operatively connected to said displaceable means and adapted to be swung laterally upon the displacement of said means, a hook member pivoted to said casing adjacent to said pivoted member and adapted to engage the same in a manner to prevent the movement thereof, said hook member being arranged to be raised out of engagement with said pivoted member when said receptacle is fully inserted beneath said discharge opening, and means for closing said cover upon the removal of said receptacle from said casing.

4. In a fare box, the combination, with a casing and a receptacle insertible therein, of a hopper carried by said casing and having a discharge opening beneath which said receptacle is inserted, a gate for closing the passage through said hopper, means normally maintaining said gate in closed position, a pivoted member operatively connected to said gate so as to be swung laterally simultaneously with the opening thereof, a locking member carried by said casing and adapted to engage said pivoted member when said gate is closed in a manner to prevent the lateral movement thereof, one of said members being arranged to be engaged by a part of said receptacle and displaced out of engagement with the other member so as to permit the free operation of said gate while said receptacle is in receiving position.

5. In a fare box, the combination, with a rectangular casing and a receptacle insertible between the side walls thereof, said receptacle having a movable cover and a spring lock adapted to prevent the opening of said cover once the same has been closed, of a hopper carried by said casing and having a discharge opening beneath which said receptacle is inserted, a rock shaft journaled at the side of said hopper parallel to said side walls, a leaf carried by said shaft and adapted to obstruct said opening, an arm pivoted to said casing upon an axis parallel to said shaft and depending between said side walls, operative connections between said arm and shaft whereby the same will be swung together, a projecting flange carried by said arm, projecting devices carried by said cover, means for automatically raising said cover upon the introduction of said receptacle into said casing and to guide said projecting devices into a position above said flange, whereby removal of said receptacle is prevented except upon the swinging of said arm, and means for closing said cover upon the removal of said receptacle from said casing.

6. In a fare box, the combination, with a casing and a receptacle insertible between the side walls thereof, said receptacle having an upwardly swinging cover, of a hopper carried by said casing and having a discharge opening beneath which said receptacle is inserted, a gate for closing the passage through said hopper, means normally maintaining said gate in closed position, a member pivoted to said casing upon an axis parallel with said side walls and operatively connected to said gate so as to be swung laterally simultaneously with the opening thereof, a gravity operated locking member carried by said casing and adapted to engage said pivoted member when said gate is closed in a manner to prevent the lateral movement thereof, and means for raising said cover upon the insertion of said receptacle into said casing, said locking member being arranged to be engaged by said cover and raised out of engagement with the pivoted member so as to permit the free operation of said gate while said receptacle is in receiving position.

7. In a fare box, the combination, with a casing and a receptacle insertible therein, said receptacle having a cover pivoted thereon upon an axis transverse to the direction of its movement, and a spring lock adapted to prevent the opening of said cover once the same has been closed, of a hopper carried by said casing and having a discharge opening beneath which said receptacle is inserted, a gate for closing the passage through said hopper, means normally maintaining said gate in closed position, a pivoted member operatively connected to said gate so as to be swung laterally upon the opening thereof, said pivoted member having an abutment, a hook pivoted to said casing and extending above said abutment and adapted to engage the same when said gate is closed in a manner to prevent the lateral movement of said pivoted member, interengaging means carried by said cover and said casing for raising said cover upon the insertion of said receptacle into the casing, said hook member being arranged to be raised by said cover out of contact with said abutment so as to permit the free movement of said pivoted member while said receptacle is in retaining position.

8. In a fare box, the combination, with a casing and a receptacle insertible therein, of a hopper carried by said casing and having a discharge opening beneath which said receptacle is inserted, gate mechanism adapted to close the passage to said hopper, means normally maintaining said gate mechanism in closed position, a pivoted member operatively connected to said gate mechanism and adapted to be moved simultaneously therewith, and a hook member pivoted to said casing and adapted to engage said pivoted member to prevent the opening of said gate mechanism in the absence of said receptacle from the casing, a part of said receptacle being formed to engage one of said members and displace the same out of obstructing contact with the other member upon the insertion of said receptacle, a part of said pivoted member being also formed for interengagement with a part of said receptacle to prevent the withdrawal of said receptacle excepting with said gate mechanism in open position.

9. In a fare box, the combination, with a casing and a receptacle insertible therein, said receptacle having an upwardly swinging cover and a spring pressed locking detent, and said cover having a rigid post adapted to be engaged by said detent upon the closing of the same, of a hopper carried by said casing and having a discharge opening beneath which said receptacle is inserted, a gate adapted to close the passage through said hopper, means normally maintaining said gate in closed position, a pivoted member carried by said casing and operatively connected to said gate so as to be swung laterally upon the opening thereof, a hook member pivoted to said casing and adapted to engage said pivoted member to prevent the opening of said gate in the absence of said receptacle from the casing, interengaging projections formed upon said casing and cover and adapted to raise said cover upon the insertion of the receptacle into the casing and close the same upon the withdrawal thereof, said cover being formed to engage said hook member and raise the same out of obstructing contact with said pivoted member upon the insertion of said receptacle, and said pivoted member being formed with a laterally projecting flange adapted to engage said post and prevent the withdrawal of said receptacle except when said gate is in open position.

10. In a fare box, the combination, with a casing and a receptacle insertible therein, said receptacle having an upwardly swinging cover and a spring pressed locking detent, and said cover having a rigid post adapted to be engaged by said detent upon the closing of the same, of a hopper carried by said casing and having a discharge opening beneath which said receptacle is inserted, gate mechanism adapted to close the passage through said hopper, means normally maintaining said gate mechanism in closed position, and a pivoted member carried by said casing and operatively connected to said gate mechanism so as to be swung laterally upon the opening thereof, said pivoted member being formed with a horizontally projecting flange, interengaging projections formed upon said casing and cover and adapted to raise said cover upon the insertion of the receptacle into the casing and close the same upon the withdrawal thereof, said projections being formed to guide said post past and above said flange upon the insertion of said receptacle and downwardly against said flange upon the withdrawal of said receptacle, whereby the withdrawal of said receptacle is prevented except with said gate mechanism in open position.

11. In a fare box, the combination, with a casing and a receptacle insertible therein, said receptacle having a cover pivoted upon an axis transverse to the direction of movement thereof and said casing and cover being formed with interfitting projections and guideways whereby said cover is moved to open position upon the insertion of said receptacle and is closed upon the removal of said receptacle, of a chute carried by said casing and having a discharge opening beneath which said receptacle is inserted, a rock shaft journaled at the side of said chute, a gate secured to said rock shaft and adapted to obstruct the passage through said chute, an arm carried by said rock shaft, a reciprocable link articulated to said arm, a manually operated lever pivoted to said casing so as to swing in a plane transverse to the direction of movement of said receptacle, said arm being connected to said link, a spring maintaining said gate normally closed, a rigid projection on said cover, a flange carried by said arm and adapted to engage said rigid projection to prevent the removal of said receptacle except said gate be open.

12. In a device of the character described, the combination, with a rectangular casing having an opening in one of its sides, and having substantially horizontal guideways formed upon opposite walls in front of said opening, the walls of said casing being also formed with vertical guideways above said first guideways and at a distance from said opening and with upwardly inclined guideways originating in front of said opening and above said first guideways, said inclined guideways communicating at their rear and upper ends with said vertical guideway, of a receptacle insertible in said casing and formed to slide upon said first guideways, a cover pivoted to said receptacle upon an axis substantially transverse to the direction of movement thereof, projections carried by said cover and adapted to follow said inclined and vertical guideways while said receptacle follows said horizontal guideways, the lower portion of said vertical guideways being formed with an inclined wall for the purpose of closing firmly said cover upon the removal of said receptacle, a spring lock carried by said receptacle and adapted to retain said cover in closed position, irreversible switch means between said inclined guideways and said vertical guideways adapted to permit the movement of the cover projections from the inclined guideways to the vertical guideways and to prevent retrograde movement thereof, a chute carried by said casing and beneath which said receptacle is adapted to be inserted, displaceable means normally closing the passage-way through said chute, a pivoted member carried by said casing above said guideways and adapted to be swung transversely of said casing, operative connections between said member and said obstructing means, and a projection carried by said pivoted member and extending into proximity to said vertical guideways whereby the movement of said cover therealong is prevented during the time that said obstructing means is closed.

13. In a fare box, the combination, with a rectangular casing and a receptacle insertible between the side walls thereof, said receptacle having a movable cover, of a hopper carried by said casing and having a discharge opening beneath which said receptacle is inserted, there being a downwardly facing ledge about said opening, a rock shaft journaled at each side of said hopper and parallel to said side walls, a leaf rigidly secured to each shaft, the plane of each leaf including the axis of its shaft and said leaves fitting closely against said ledge and snugly against the opposite leaf when in closed position, means normally maintaining said leaves in contact with said ledge, means for depressing said leaves simultaneously so as to discharge fares into the middle of said receptacle, and means for automatically closing said cover upon the removal of said receptacle from said casing.

In testimony whereof, I hereunto affix my signature in the presence of two witnesses.

WALTER T. COOK.

Witnesses:
GEORGE H. SCOTT,
HAROLD E. SMITH.

Copies of this patent may be obtained for five cents each, by addressing the "Commissioner of Patents, Washington, D. C."